Jan. 11, 1955    J. K. BALZHISER    2,699,198
TIRE BUILDING DRUM
Filed Aug. 4, 1951
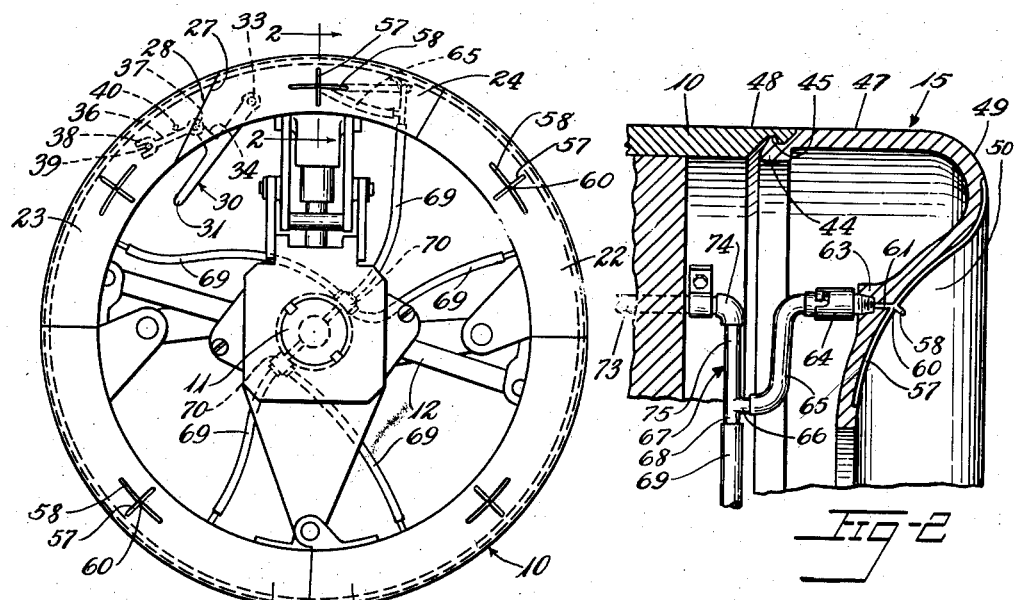
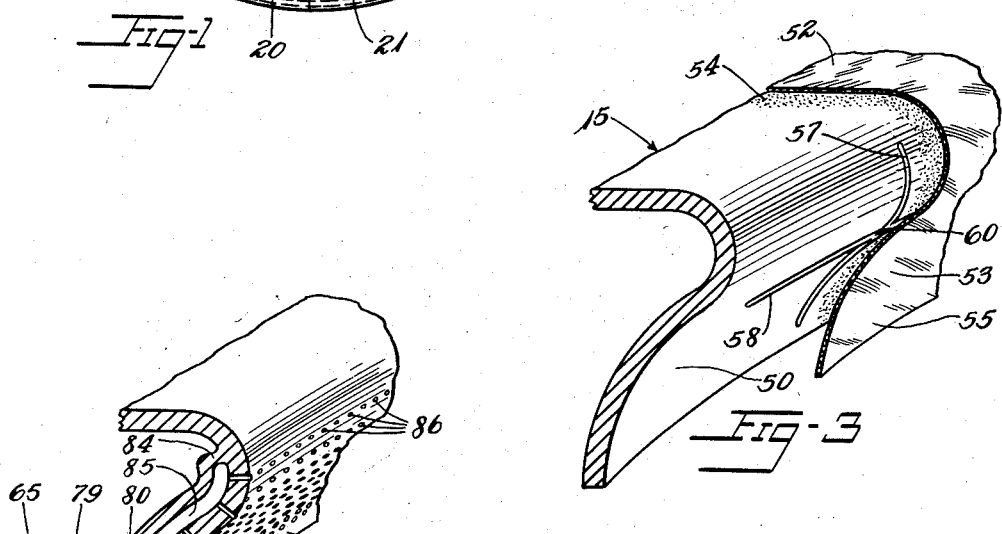
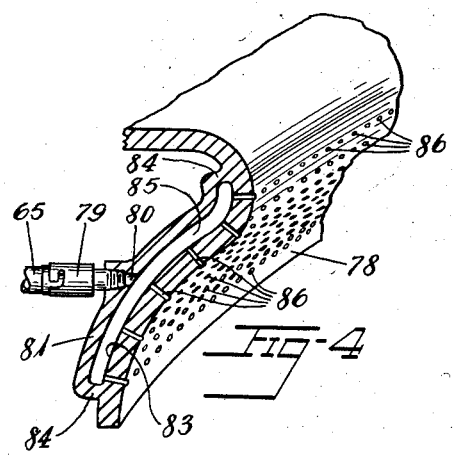
Inventor
James K. Balzhiser United States Patent Office 2,699,198
Patented Jan. 11, 1955

2,699,198

TIRE BUILDING DRUM

James K. Balzhiser, Cuyahoga Falls, Ohio, assignor to The B. F. Goodrich Company, New York, N. Y., a corporation of New York Application August 4, 1951, Serial No. 240,363

10 Claims. (Cl. 154—9)

This invention relates to tire-building and more especially it relates to the removal of a tire from a substantially cylindrical, collapsible core or drum around which the tire has been built.

In building a tire using a plurality of plies of tire fabric, it has been a usual procedure to turn the margins of the first ply wrapped on the drum inwardly around the circumferential margins of the drum so that the beads of the tire may be fitted against the drum margins over the inwardly turned ply margins. To keep these ply margins in place until the beads have been properly located it has been necessary to cement portions of the ply margins to the drum margins. This cement, however, has made the removal of the tire from the drum on which it is built a very laborious and time-consuming task. Also, even where cement is not applied the nature of the materials may be such as to become adhered strongly to the drum.

The problem of breaking this adhesive bond after the tire has been built has been particularly troublesome in the construction of tires having relatively wide spacing between sidewalls but having beads which are relatively close together. Tires of this type have been ordinarily built on drums having bead-receiving shoulders offset inwardly from the cylindrical surface of the drum and also undercut or recessed into the ends of the drum so that the beads of a tire built on this type drum are not twisted or deformed when the tire is eventually shaped for curing. For building small sized tires of this type, drums have been provided having these shoulders formed integrally with the drum and these shoulders collapse with the drum when a tire is to be removed after its construction. Due to the cement between the first ply and the shoulders the tire has frequently remained adhered to the drum after the drum has been collapsed and as a result the tire may be improperly distorted. The drums used for building larger tires of this type (size 10.00 x 20 and larger) have an undercut, bead-receiving shoulder at each circumferential margin of the drum. Each shoulder has been formed of several arcuate segments which are removably engageable with the cylindrical portion of the drum. Before a tire built on this latter type drum can be removed these segments must be individually broken loose from the tire and disconnected from the drum and it has been very difficult to remove these segments because of the adhesive bond.

It is an object of the present invention to overcome the foregoing difficulties and to provide for breaking the cement bond between the circumferential margins of the drum and a tire after the tire is built so that the tire may be removed from the drum quickly and easily. Another object is to provide for introducing between the drum and the bead portion of the tire adhered thereto a fluid medium under sufficient pressure to break the bond and force the bead portion away from the drum.

Further objects are to provide for releasing the bead portions of the tire casing from the drum during rotation of the drum, and to provide for detaching the undercut segments from the drum individually independent of the fluid pressure means.

A further object is to provide improvements in the construction of a building drum so that the aforesaid objects may be accomplished.

These and other objects will be apparent from the following detailed description of the drawings.

In the drawings,

Fig. 1 is an end view of a tire-building drum embodying the present invention;

Fig. 2 is a cross-sectional view on an enlarged scale taken on the line 2—2 of Fig. 1;

Fig. 3 is a perspective view of a portion of one end of the building drum of Fig. 1 and showing part of a ply cemented to the portion; and Fig. 4 is a perspective view of a portion of one end of a building drum and showing a modified form of the invention.

The invention is illustrated in the drawings in connection with a cylindrical, collapsible, tire-building drum 10 of known design which is supported and which may be axially rotated by a shaft 11. The drum may be expanded and collapsed by a mechanism 12 inside the core, the operation of which is well known in the industry.

The drum 10 shown is of a type used for building heavy-duty tires having relatively wide spacing between sidewalls but having beads which are relatively close together and therefore this drum is provided at each of its circumferential margins with a removable, undercut bead-receiving shoulder 15. Each shoulder is composed of arcuate segments 20, 21, 22, 23 and 24 which, when assembled on the drum, fit together end-to-end to form an annular ring substantially equal in diameter to the diameter of the drum. Segment 24 is a key segment. It is fitted between segment 22 and segment 23 after all the other segments are positioned on the drum and key segment 24 is the first segment to be removed when the shoulder is to be disassembled from the drum. This segment 24 has an end 27 which is beveled and which fits against a correspondingly beveled end 28 on the adjacent segment 23 when the segments are assembled, as shown in Fig. 1 so that the key segment 24 may be removed from the shoulder assembly or positioned therein by moving the segment 24 radially toward or away from shaft 11, respectively.

The segments may be locked in assembled relation on the drum by a small toggle latch 30 at end 27 of segment 24. This latch 30 includes a handle 31, the end of which is pivotally connected to segment 24 by a pivot 33. At about the middle of handle 31 there is a spur 34 to which a link 36 is connected at a pivot 37. The opposite end of link 36 has a small yoke 38 which is engageable with a pin 39 on segment 23. When the latch is in the locked position as shown in Fig. 1 the yoke 38 is engaged with pin 39 and the side of link 36 is pressed against a short pin 40 on segment 23. The pin 40 limits the movement of the link 36 and pin 40 is positioned so that when the link 36 is in contact with this pin the pivots 33, 37 and the pin 39 are substantially aligned and therefore the latch is fastened. To remove key segment 24 the toggle latch is unfastened by pulling handle 31 toward shaft 11 about pivot 33 and this movement causes link 36 to swing between pin 39 and pivot 37 to a position where the yoke 38 is disengaged from pin 39. The key segment 24 may then be moved radially inward toward shaft 11.

The shape of each shoulder segment is brought out in detail in the cross-sectional view in Fig. 2. Each of these segments has an arcuate hook portion 44 which interlocks with a portion of a groove 45 formed around the inside edge of each end circumferential margin of the building drum 10 to connect the segment with the drum. The hook portion 44 projects laterally from a smooth peripheral surface 47 of each segment and when a segment is engaged with the building drum this surface 47 fits flush with the cylindrical surface 48 of the building drum and serves as a lateral extension of the drum. Each segment is curved downwardly as indicated at numeral 49 and is then curved backwardly and downwardly under its surface 47 to form an ogee or offset face portion 50. When all of the segments are assembled at each end of the drum the faces 50 of the segments define an annular bead-receiving recess at each drum margin into which the beads of a tire are fitted during the construction of the tire.

In building a tire on drum 10 a first ply 52 (Fig. 3) of the tire fabric is placed on the drum and then each margin 53 of the ply is turned downwardly around the segmental shoulders at the margins of the drum. To keep this ply margin 53 in place it is cemented to the faces 50 of the segments by cement 54 substantially as indicated by the fragment of fabric and the stippled area on the segment in Fig. 3. One or more plies may be placed over the first ply depending on the specification for the tire being built and then a bead (not shown) is set against this fabric in the recess on each shoulder of the drum. The fabric portion 55 depending from each shoulder is then folded outwardly and upwardly to encase its respective bead. The construction of the tire may be completed by applying additional plies, breakers, tread, etc. as desired.

According to the present invention the removal of the tire after it is completely built is facilitated by forcing a fluid medium under pressure between the first ply 52 and the shoulders 15 to break the bond at the interface therebetween formed by the cement 54. In the embodiment of the invention shown in Figs. 1–3 fluid may be introduced and dispersed between the first ply and the shoulders by a pair of intersecting grooves 57 and 58 in the offset face 50 of each shoulder segment. Groove 57 extends radially relative to the curvature of each segment and groove 58 is arcuately formed on each segment so that the grooves intersect each other substantially perpendicularly. At the intersection 60 of the pair of grooves there is a relatively small hole 61 which extends through the offset portion of each segment and through a small boss 63 formed on the inside surface of the offset portion just opposite the intersection 60 of the grooves 57 and 58. The boss 63 is tapped to receive a releasable coupling 64 to which a flexible conduit 65 is connected. The conduit 65 is flexible and the coupling 64 is provided so that the conduit 65 may be readily connected to the boss 63 when the segments are being assembled on the drum and easily disconnected therefrom when the segments are disassembled. At the margin of the drum as shown in Fig. 2 the opposite end of conduit 65 is connected to one branch 66 of a fitting 67 and a second branch 68 of this fitting is in turn connected by another flexible conduit 69 to a fitting 70 threaded into shaft 11. The flexible conduit 69 is provided so that the drum may be collapsed and expanded in the regular manner without interference from the conduit 69. Shaft 11 is hollow and the fluid medium may be supplied to the hollow shaft by any suitable valve means. The medium will be conducted through the shaft 11 and into conduit 69 through which it is conducted to conduit 66 and through the hole 61 into the grooves 57 and 58 where the medium will impinge against the inside surface of the first ply and force itself between the face 50 of the segment and the ply to break the cement bond.

The shoulder segments at the opposite end of the drum (not shown) may each be provided with grooves 57 and 58, a releasable coupling 64, a flexible conduit 66, etc. similar to the equipment shown in Fig. 2. Each conduit 66 on this side of the core may be connected, however, to a conduit 73 which is fastened to the collapsible sections of the drum and extends across the underneath side of the drum section parallel to shaft 11. As shown in Fig. 2 this conduit 73 has an end 74 which is connected to a third branch 75 of fitting 67 so that the single conduit 69 from shaft 11 supplies fluid medium simultaneously to the shoulder segments on opposite sides of the drum. The conduit 73 is positioned so that the drum may be collapsed and expanded in the normal manner.

In Fig. 1, the drawing shows the conduits and fittings, etc. in dotted lines for supplying medium to the grooves 57 and 58 of the key segment 24. The grooves 57 and 58 of each of the other segments are connected through their respective flexible conduits 69 to hollow shaft 11 in substantially the same manner as is illustrated in connection with the key segment 24. Sometimes the cement bond may be broken by injecting the fluid medium through only the key segment but it is preferable to supply the medium to each segment individually.

The hollow shaft 11 is an advantageous structure since by means of it fluid may be injected between the tire and the drum shoulders as soon as the tire is completely built and while the drum is being rotated. Other means may be provided however to supply fluid to the conduits 69, etc.

The fluid medium ordinarily employed to break the cement bond will be compressed air although it may be desirable under some conditions to inject a liquid, preferably a solvent of rubber, or air containing a suitable solvent such as benzene or the like dispersed in it, which will seep in between the ply and the shoulders and operate somewhat more quickly. Generally air alone under sufficient pressure will be satisfactory, however.

As soon as the tire is broken loose from the drum shoulders the conduit 65 will be disconnected from each shoulder and the latch 30 may be operated to loosen the key segment 24. Then this segment and the others may be pulled out of the tire.

Fig. 4 shows a portion of a shoulder of the same general type as is shown in Fig. 2 but which is provided with different means for conducting the fluid medium through its offset portion to the face 78 of the segment where the medium can impinge against the inside face of the first ply. In this modification the flexible conduit 65 from the shaft 11 is connected to a releasable coupling 79 mounted in a passage 80 through a plate 81 which is spaced from the rearward surface 83 of the offset portion of the shoulder by narrow strips 84—84 along the top and bottom edge of plate 81. Each end of plate 81 will also be connected to surface 83 by similar strips (not shown) so that between the offset portion of the shoulder segment and the plate 81 there is an enclosed chamber 85 into which the fluid medium is introduced through the passage 80 by the conduit 65. The offset portion of the shoulder is provided with a plurality of small holes 86, each of which extends through the offset portion to communicate with the chamber 85. When the fluid medium is supplied to chamber 85 the medium passes through these small holes 86 and is directed against the first ply of the tire where it is effective to break the bond between the shoulder and the ply. Segments formed according to Fig. 4 may be assembled and disassembled on the drum in the same manner as the segments shown in Figs. 1–3.

In the tire-building drums for smaller tires of this type, the shoulders at each end of the drum will have the same cross sectional shape as the shoulder segment shown in Fig. 2 but the shoulders will be formed integrally with the drum. The offset portions of these integral shoulders may be provided with several spaced pairs of intersecting grooves like the embodiment shown in Figs. 1–3 or the offset portions may be provided with a chamber similar to chamber 85 and a plurality of openings similar to openings 86 in Fig. 4. The fluid medium may be supplied to the shoulders by a flexible conduit 65, etc. as shown in Fig. 2. Since the shoulders are formed integrally with the drum, the shoulders will collapse with the cylindrical portion of the drum and therefore it will not be necessary to disconnect the several conduits 65 from the shoulder. Fluid may be directed against the bead portions of a tire on this type of drum either prior to or simultaneously with the step of collapsing of the core in order to break the bond.

Variations of the invention may be made without departing from the scope of the invention as it is defined in the following claims.

I claim:

1. Tire-building apparatus comprising a collapsible tire-building drum having a pair of laterally-spaced bead-receiving portions against which the beads of the tire casing are adapted to be disposed and a circumferential surface intermediate said bead-receiving portions to which areas of the interior of a tire casing are adhered in building a casing, and fluid-conducting means formed in said surface intermediate the bead-receiving portions for distributing a fluid medium between said surface and said areas of the tire casing adhered thereto to loosen the bond between said areas and said surface.

2. Tire-building apparatus comprising a rotatable tire-building drum having a peripheral surface on which the materials of the tire casing are assembled in building the casing, bead-receiving portions at each end of the drum spaced radially inward from said peripheral surface, and between said peripheral surface and each of said bead-receiving portions an annular surface at each end of the drum undercut from said peripheral surface to which areas of the casing forming its interior surface are adhered during the building of the casing, fluid-conducting means formed in said undercut surface for distributing a fluid medium between said undercut surface and said adhered areas of the tire casing to break the bond therebetween, and means rotatable with the tire-building drum for supplying said fluid to said fluid-conducting means.

3. Tire-building apparatus comprising a tire-building drum having a peripheral surface on which materials for building a tire casing are assembled and having at each end of the drum a shoulder formed of a plurality of segments removably engaged with the drum, each segment including a bead-receiving portion offset radially inwardly from said peripheral surface for receiving the beads of the tire casing and an annular surface undercut from said peripheral surface and located between said peripheral surface and the bead-receiving portions to which annular surface some of the materials forming the interior surface of the tire casing are adhered during the building of the casing, and fluid-conducting means formed in said annular surface of each segment to distribute a fluid medium between said undercut surface and said materials of the tire casing adhered thereto.

4. Tire-building apparatus comprising a collapsible tire-building drum having a peripheral surface on which materials for building a tire casing are assembled, a shoulder at each end of the drum having a bead-receiving portion offset radially inwardly relative to said peripheral surface of the drum and an annular surface undercut from said peripheral surface to which areas of the interior surface of the tire casing intermediate the beads of the casing are adhered during the building of the tire casing, an opening through each shoulder extending to said undercut surface of the shoulder, and a conduit connected to said opening for conducting fluid to said opening through which it is introduced between said annular surface and said casing areas adhered thereto to break the bond between said areas and said annular surface.

5. Tire-building apparatus comprising a rotatable, collapsible tire-building drum having a peripheral surface on which materials for building a tire are assembled, a shoulder at each end of the drum, each shoulder being formed of a plurality of arcuate segments removably engaged with the ends of the drum and cooperating to provide at each end of the drum a bead-receiving portion offset radially inwardly relative to said peripheral surface of the drum and an annular surface undercut from said peripheral face to which surface areas of the interior surface of the tire casing intermediate the beads of the tire are adhered during the building of the tire casing, an opening through at least one of said segments in communication with said annular surface, means rotatable with the drum for containing a fluid medium under pressure, and a flexible conduit releasably connected to said opening and to said rotatable means for conducting fluid to said opening through which it is introduced between said annular surface and said casing areas adhered thereto to break the bond and facilitate the removal of the shoulder segments from the tire casing.

6. An arcuately curved, bead-receiving shoulder segment for a tire-building drum, said segment comprising a portion releasably engageable with a margin of said drum and having a surface located radially inwardly from said portion engageable with the drum to which surface an area of the interior surface of a tire casing adjacent the beads thereof is adapted to be adhered during the construction of the tire casing, a groove in said surface, and an opening through the shoulder communicating with said groove, through which opening and groove a fluid medium is adapted to be introduced between said surface and said area of the interior of the tire casing adhered thereto to break the bond therebetween.

7. An arcuately curved, bead-receiving shoulder segment for a tire-building drum, said segment comprising a portion releasably engageable with a margin of said drum and having a surface located radially inwardly from said portion to which surface an area of the interior surface of a tire casing adjacent the beads thereof is adapted to be adhered during the construction of the tire, an enclosed chamber on the segment spaced away from said surface adapted to receive a fluid medium under pressure, and a plurality of passages in the segment extending from said surface to said chamber through which passages said fluid in the chamber may be introduced between said surface and said area of the tire casing adhered thereto to break the bond therebetween.

8. The method of removing an unvulcanized tire casing from a collapsible tire-building drum having a pair of laterally-spaced bead-receiving portions against which the beads of the tire casing are disposed and a circumferential surface intermediate said bead-receiving portions to which areas of the interior of the tire casing are adhered in building the tire casing, which method comprises introducing a fluid medium under pressure into the region intermediate the beads of the tire casing between said areas of the inside surface of the casing and said surfaces of the drum to which said areas are adhered, and collapsing the drum to separate said adhered surfaces for withdrawal of the tire casing from the drum.

9. The method of separating areas of the interior surface of an unvulcanized tire casing from generally radially-directed surfaces of a collapsible tire-building drum to which said areas of the casing are adhered during the building of the tire casing, which method comprises rotating the drum and introducing a fluid medium into the region intermediate the beads of the tire casing between said adhering areas and said radially-directed surfaces of the tire-building drum to loosen the bond therebetween, and then collapsing the drum.

10. The method of removing an unvulcanized tire casing from a collapsible tire-building drum having a plurality of shoulder segments removably engaged with the ends of the drum, each segment being formed with a bead-receiving portion offset radially inwardly from the periphery of the drum and with a surface extending from said bead-receiving portion to the drum to which surface areas of the interior of the tire casing are adhered during the building of the tire casing, which method comprises directing a fluid medium under pressure into the region between said interior of the casing and said surface of each segment to break the bond therebetween, then disengaging said shoulder segments from the drum and withdrawing them from the tire casing, and then collapsing the drum for withdrawal of the tire casing.

References Cited in the file of this patent

UNITED STATES PATENTS

| Number | Name | Date |
|---|---|---|
| 1,754,502 | Denmire | Apr. 15, 1930 |
| 1,906,569 | Gibbons | May 2, 1933 |
| 2,155,316 | Lauterbach | Apr. 18, 1939 |
| 2,291,862 | Bailey | Aug. 4, 1942 |
| 2,313,035 | Breth | Mar. 9, 1943 |
| 2,363,442 | Scott | Nov. 21, 1944 |
| 2,406,458 | Gerndt et al. | Aug. 27, 1946 |
| 2,471,738 | Goodman | May 31, 1949 |
| 2,484,641 | O'Hara | Oct. 11, 1949 |
| 2,488,863 | Haase | Nov. 22, 1949 |
| 2,496,137 | Sternad et al. | Jan. 31, 1950 |
| 2,508,204 | Weber et al. | May 16, 1950 |
| 2,663,902 | Anderson | Dec. 29, 1953 |
| 2,605,195 | Boughton | July 29, 1952 |